(12) United States Patent
Eichblatt et al.

(10) Patent No.: US 7,136,776 B2
(45) Date of Patent: Nov. 14, 2006

(54) METHOD FOR EVALUATING PROCESSES FOR MANUFACTURING COMPONENTS

(75) Inventors: Stephen Eichblatt, San Jose, CA (US); Laurence Samuelson, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 10/976,454

(22) Filed: Oct. 29, 2004

(65) Prior Publication Data

US 2006/0106572 A1 May 18, 2006

(51) Int. Cl.
*G06F 17/18* (2006.01)

(52) U.S. Cl. ...................................... 702/181
(58) Field of Classification Search ......... 702/179–185
See application file for complete search history.

(56) References Cited

U.S. PATENT DOCUMENTS

| | | | |
|---|---|---|---|
| 3,751,647 A | 8/1973 | Maeder et al. | |
| 5,047,947 A | 9/1991 | Stump | |
| 5,523,960 A | 6/1996 | Jeong | |
| 5,598,341 A | 1/1997 | Ling et al. | |
| 5,636,144 A | 6/1997 | Kurtzberg et al. | |
| 5,765,137 A | 6/1998 | Lee | |
| 5,978,751 A | 11/1999 | Pence et al. | |
| 6,058,335 A | 5/2000 | Kim | |
| 6,222,936 B1* | 4/2001 | Phan et al. | 382/149 |
| 6,393,602 B1 | 5/2002 | Atchison et al. | |
| 6,467,153 B1 | 10/2002 | Butts et al. | |
| 6,611,735 B1 | 8/2003 | Henly et al. | |
| 6,651,192 B1 | 11/2003 | Viglione et al. | |
| 6,789,031 B1* | 9/2004 | Wang | 702/81 |
| 2003/0218818 A1 | 11/2003 | Bement et al. | |

FOREIGN PATENT DOCUMENTS

| | | |
|---|---|---|
| JP | 58145148 | 8/1983 |
| JP | 9305663 | 11/1997 |
| WO | WO 00/65638 | 2/2000 |

OTHER PUBLICATIONS

Robert A. Rutledge, et al. "Data Wherehousing for Manufacturing Yeild Improvement" SUGI 25 Conf, Paper 135-25 (IBM) Apr. 9-12, 2000.
"Western Digital Rewrites Industry Standards for Quality with a Global Data Warehouse" Western Digital QIS Case Study Aug. 5, 1999.

* cited by examiner

*Primary Examiner*—Michael Nghiem

(57) ABSTRACT

Embodiments of the present invention pertain to methods of evaluating processes for manufacturing components. In one embodiment, an average probability of a first component to fail is calculated based on a measurement of a parameter where the first component was built using a new process. Another average probability of a second component to fail is calculated based on a measurement of the parameter where the second component was built using an existing process. A process index is calculated by determining a difference between the average probabilities for the second component and the first component. An estimation is made as to whether the new process is better than the existing process based on the process index.

21 Claims, 4 Drawing Sheets

METHOD FOR EVALUATING PROCESSES FOR MANUFACTURING COMPONENTS

TECHNICAL FIELD

Embodiments of the present invention relate to manufacturing. More specifically, embodiments of the present invention relate to evaluating processes for manufacturing components.

BACKGROUND ART

Manufacturers have frequently used statistical analysis to evaluate whether a product meets quality standards and can therefore be sold. The statistical analysis typically involves subjecting a product that is made of components to a test to determine whether the product passes the test. For example, a disk drive is made of many components, such as a read/write head, the pole tip of the read/write head, a platter, a head, etc. Each of these components have parameters that can be measured. For example, the recession of the pole tip and the strength of the magnetic signal generated by the read/write head (commonly referred to as "amplitude") are a couple of examples of parameters of read/write heads that can be measured.

The test used in determining the quality of the product, such as a disk drive, could involve creating a set (e.g., population) of disk drives and testing the set of disk drives along many parameters to determine the quality of the disk drives. For example, in testing for amplitude and recession a population of read/write heads can be built from a single wafer to try and make the read/write heads as identical as possible. Then the read/write heads can be sorted into categories from lowest to highest according to the amount of recession associated with the pole tips of the read/write heads so that each category has approximately the same amount of recession. Then disk drives can be built using the categorized read/write heads and the disk drives can be tested. While performing the test, the amplitude, can be measured.

The values of the measurements can be used to perform statistical analysis. FIG. 1 depicts aspects of performing statistical analysis. More specifically FIG. 1 depicts two graphs 110, 120 and two equations 130, 140. The graph 110 has an axis for the amount of recession 114 associated with pole tips and a probability of failure 112. Each pole tip will have a particular amount of recession 114 that will result in a particular amount of amplitude and an associated probability of failure 112. The amount of recession 114 that results in a particular amount of amplitude and probability of failure 112 are graphed on graph 110 resulting in the curves AMP1, AMP2, AMP3. Graph 120 plots the probability of failure 122 that results from various amounts of amplitude 124. Since amplitude is inversely proportional to the amount of recession associated with a pole tip, graph depicts the curves of recession (REC1, REC2, REC3) that result from the various the values of recession associated with various degrees of amplitude.

The probability of failure 130 (e.g., Pf) is an equation that is used to evaluate the probability of components to fail a test, such as a functional test of a disk drive, based on various parameters that were measured, according to one embodiment. Equation 132 is a simplified representation of the equation 130 and equation 134 is an expanded representation of the equation 130. The expanded version 134 of the equation 130 is a polynomial. Further, the probabilities to fail for each of the components can be used to calculate an average probability to fail. For example, all of the probabilities of failure for all of the components can be averaged to calculate an average probability of fail using equation 140.

Although the equations 130, 132, 134 are shown using values for the recession and amplitude parameters, values for many parameters can be used in calculating the results of the equations. For example, all dimensions of the read/write heads as well as various electrical and magnetic properties can be used. The equations 130, 132, 134 are commonly referred to as the multiple variant model fitting which is used in modeling of product yield based on parametric data.

In order to stay competitive, manufacturers have to constantly try to provide better quality products while at the same time maintaining or even reducing costs. There may be a number of reasons that manufacturers may want to modify a parameter of a component. For example, they may want to make a less expensive version of the component or a certain parameter of the component may be difficult to measure. So they may want a version of the component where that parameter is easier to measure or where that parameter does not need to be measured at all.

In order to do this, manufacturers have to design new processes for manufacturing their products. For example, the manufacturer of a disk drive may want to improve one of the components, such as the pole tip, that goes into creating a disk drive. They may design a new process that they believe will improve a parameter of the pole tip, such as pole tip recession. However, in modifying the pole tip recession other parameters of the pole tip, such as amplitude, may also be affected. Thus, it is difficult to determine whether a product meets quality standards for sale after using these new processes to build components of the product.

Determining whether a product meets quality standards involves setting up a manufacturing environment for building the product, building a lot of the product, and testing a lot of the product, all of which is very time consuming and expensive. For these and other reasons, a method for evaluating processes for manufacturing components would be valuable without requiring the setup of the manufacturing environment to build a complete product, etc.

DISCLOSURE OF THE INVENTION

Embodiments of the present invention pertain to methods of evaluating processes for manufacturing components. In one embodiment, an average probability of a first component to fail is calculated based on a measurement of a parameter where the first component was built using a new process. Another average probability of a second component to fail is calculated based on a measurement of the parameter where the second component was built using an existing process. A process index is calculated by determining a difference between the average probabilities for the second component and the first component. An estimation is made as to whether the new process is better than the existing process based on the process index.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

OVERVIEW OF A METHOD FOR EVALUATING PROCESSES FOR MANUFACTURING COMPONENTS

Conventional approaches have only considered the quality of the components built using a particular process. However, according to one embodiment of the invention, the quality of components built using a new process can be compared to the quality of components built using an existing process. Additionally, a new process may improve the results of a parameter but it may at the same time take twice as long to build components, for example, using the new process. Therefore, according to another embodiment, the rate of production using a new process can be compared to the rate of production using an existing process. Further, estimating the savings or loss due to using the new process can be of importance. Therefore, according to yet another embodiment of the invention, the value of the product can also be taken into account. According to still another embodiment of the invention, a variety of process indexes can be calculated that can take into account the difference in quality and rates of production of components built using different processes as well as the value of the components, as will become more evident. A process index can be used to evaluate processes for manufacturing components without requiring the setup of a manufacturing environment to build an entire product, as will become more evident.

Figure 2:
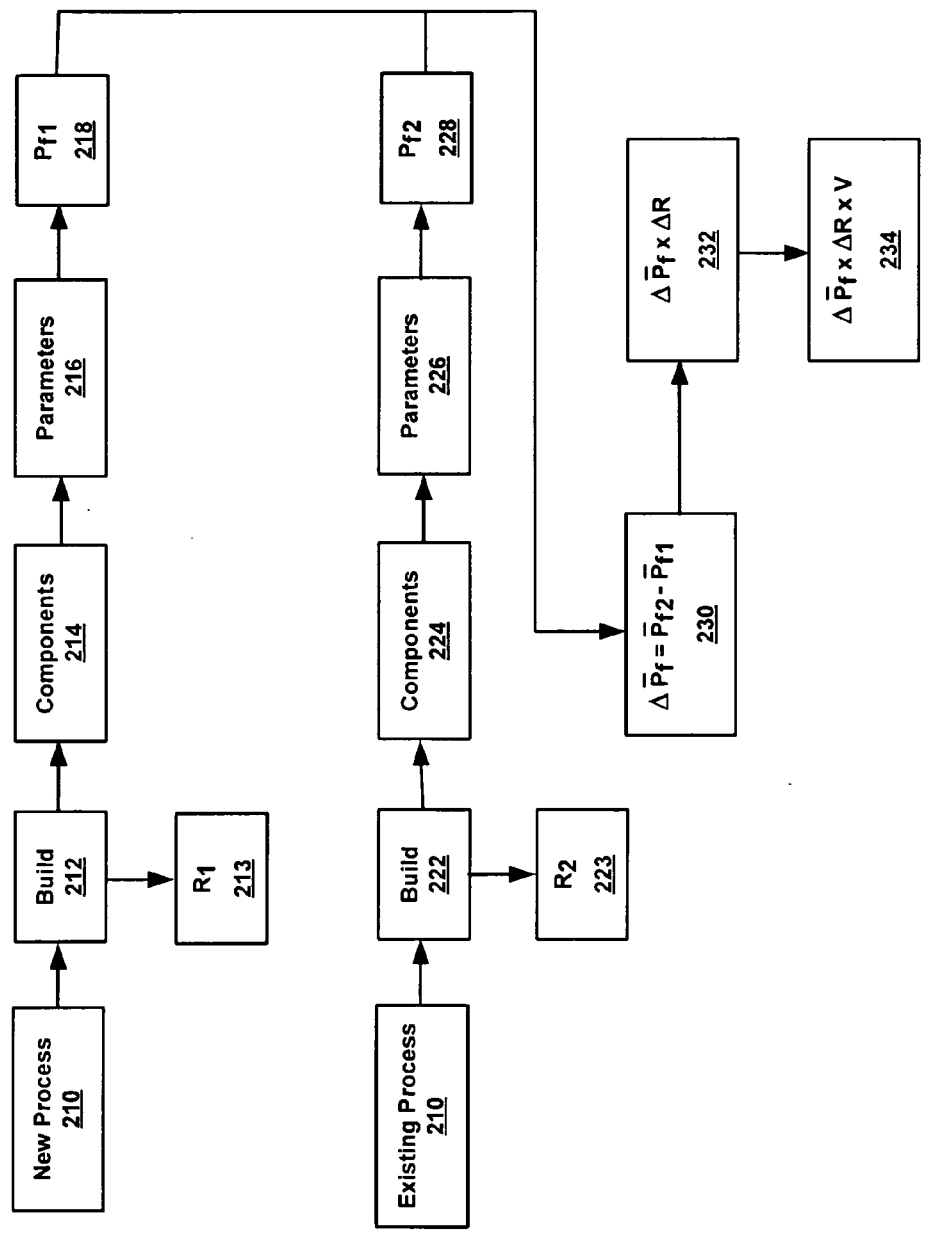
FIG. 2 is a block diagram of a method for evaluating processes for manufacturing components, according to embodiments of the present invention.

FIG. 2 is a block diagram of a method for evaluating processes for manufacturing components, according to embodiments of the present invention. The blocks in FIG. 2 can be arranged differently than as illustrated, and can implement additional or fewer features than what are described herein. Further, the features represented by the blocks can be combined in various ways.

In the FIG. 2 embodiment, a new process 210 for manufacturing 212 components 214 is compared to an existing process 220 for manufacturing 222 components 224. For example, the components 214, 224 may be read/write heads for disk drives and a new process 210 has been designed that will hopefully decrease recession of the pole tips of the read/write heads, thus, improving the amplitude of the magnetic signal of the read/write heads. Setting up a manufacturing environment to manufacture (e.g., build 212) disk drives that incorporate the new read/write heads as well as actually manufacturing the disk drives using a new process 210, for example, is expensive. Providing a method for evaluating the new process 210 in a way that avoids setting up the manufacturing environment to manufacture the disk drives, actually manufacturing the disk drives, etc. is of great value.

According to one embodiment, the new process 210 is compared to the old process 220 using statistical analysis based on various parameters 216, 226 of the components 214, 224 built 212, 222 (e.g., manufactured) using the new and existing processes 210, 220. For example, components 214, 224, such as the read/write heads, can be built 212, 222 without setting up a manufacturing environment for the entire product (e.g., disk drives). Building one type of component, such as read/write heads, can be relatively easy and inexpensive. The rates of production 213, 223 (e.g., R1 and R2 respectively) can be measured while the components are being built. The rates of production 213, 223 can be measured in terms of units per period of time, such as the number of components 214, 224 that can be built in a day.

Tests can be performed on the read/write heads that simulate how the components 214, such as the read/write heads, would have performed if the read/write heads had been assembled into disk drives. Parameters 216, such as recession of the pole tip and amplitude, the read/write heads can be measured during the simulation.

Statistical analysis can be used to compute values, such as the average probabilities of failure 218, 228, the difference (e.g., represented by the delta symbol "Δ") between the average probabilities of failure, etc. According to one embodiment, statistical analysis can be used to calculate a process index 230, 232, 234, which takes into account the quality of components built using an existing process 220 verses a new process 210. There are various ways of computing a process index 230, 232, 234 that can be used to determine whether additional more expensive testing would be worth while, as will be described in more detail.

If the process index 230, 232, 234 reflects that the new process 210 would provide mediocre quality and/or an increase in the rate of production 213, then it may not make sense to setup a manufacturing environment to build an entire product in order to perform further analysis and/or to sell the product. However, even though a process index 230, 232, 234 reflects that a new process 210 would provide good quality and/or components 214 built 212 using the new process 210 is less than the rate of production 223 for building 222 components 224 using the existing process 220, it may still make sense to set up a manufacturing environment to create a complete product from the components 214, for the purpose of performing additional tests on the completed product, performing beta tests, performing prototyping, etc. If the risks are high, for example in the case of components 214, such as prescription medications or devices that can be embedded in the human body, then even if the process index 230, 232, 234 alone provides outstanding results, the manufacturer may very well decide to perform extensive testing on a completed product before offering the product for sale. However, if the risks are low, the process index 230, 232, 234 alone may provide enough information to decide to go ahead with production and skip additional testing.

EQUATIONS USED IN EVALUATING PROCESSES FOR MANUFACTURING COMPONENTS

Figure 1:
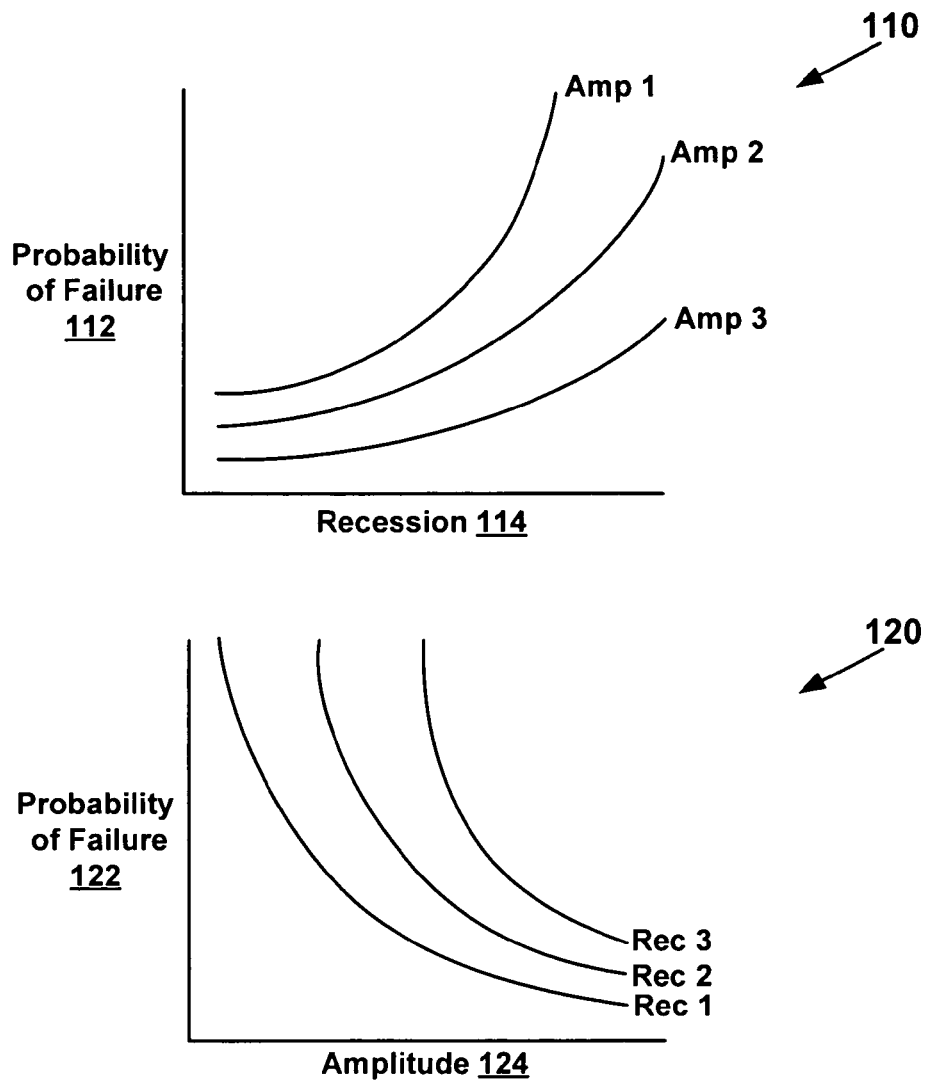
FIG. 1 depicts aspects of performing statistical analysis.

As already stated, the probabilities to fail (calculated using equation 134 for example) for each of the components 214, 224 can be used to calculate an average probability to fail 218, 228. For example, referring to FIGS. 1 and 2, once parameters 216, 226 for the components 214, 224 using both the new process 210 and the existing process 220 have been measured, the results can be evaluated using the equation 134, for example, for the probability of components to fail. The probabilities to fail for the components 214 built using the new process 210 can be used to calculate one average probability to fail 218 while the probabilities to fail for the components 224 built using the existing process 220 can be used to calculate another average probability to fail 228. Equation 140 can be used to calculate the average probabilities to fail 218, 228.

According to one embodiment. A process index 230 can be used to compare the quality of components 214, 224 built using different processes 210, 220. For example, a process index 230 can be calculated based on the difference between the average probabilities to fail 218, 228 using the new process 210 and the existing process 220. According to another embodiment, a process index 232 can take into account the rates of producing 213, 223 of components 214, 224 built using different processes 210, 220. For example, the difference between the rates of production (e.g., $\Delta R = R2 - R1$) can be multiplied with the difference between the average probabilities. According to still another embodiment, a process index 234 can take into account the value of the components 214, 224 to provide an estimate of savings or loss due to using the new process 210. For example, the value of the components 214, 224 can be multiplied by the difference between the average probabilities and the difference in the rates of production. Thus, a process index 230, 232, 234 can be used to evaluate whether the new process 210 is better than the old process 220 without requiring the set up of the manufacturing environment to manufacture disk drives, etc.

Frequently in manufacturing, there are certain parameters that are expensive to test. Money can be saved if the testing of that parameter can be relaxed. Measuring the amount of recession for a pole tip is an example of a parameter that is expensive to test. Further, the rate of production may also increase if the amount of testing for a parameter is relaxed, resulting in further savings. However, if the testing of one parameter is relaxed, it may be necessary to determine the effects this will have on other parameters, such as amplitude. A process index 230, 232, 234 helps to determine the effects of reducing the amount of testing for a parameter. A process index 230, 232, 234 can help to determine the effects in terms of quality, rate of production, etc.

Further, although many of the examples described herein have been limited to the parameters 216, 226 associated with one type of component 214, 224, such as recession and amplitude associated with the pole tips of read/write heads, a process index 230, 232, 234 can take into account the parameters associated with more than one type of component. For example, the average probabilities of failure for spindles, actuators, lapping pads, can all be calculated. A process index 230, 232, 234 can then be calculated on the basis of average probabilities, rates of production, values, etc. for many types of components, such as read/write heads, spindles, actuators, lapping pads, etc., for example.

According to one embodiment, components 224 do not have to be built using the existing process 220 at the time that components 214 are built using the new process 210 in order to calculate a process index 230, 232, 234. Instead, since components 224 have been built 222 in the past using the existing process 220, the parameters 226 of these components 224 could have been measured and the values from the measurements could have been saved for later comparisons with new processes 210, for example by storing the values in a table. The values can be retrieved from the table and used in calculating the average probability of failure 228 for components 224 built with the existing process 220, etc.

A SYSTEM FOR EVALUATING PROCESSES FOR MANUFACTURING COMPONENTS

Figure 3:
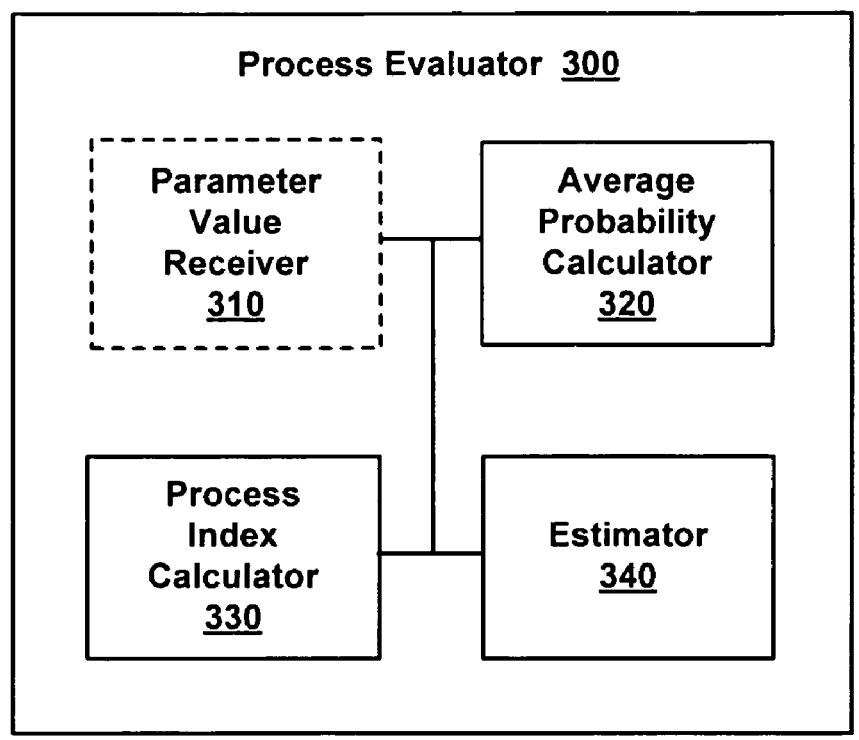
FIG. 3 is a block diagram of a system for evaluating processes for manufacturing components, according to one embodiment.

FIG. 3 is a block diagram of a system for evaluating processes for manufacturing components, according to one embodiment. The blocks in FIG. 3 can be arranged differently than as illustrated, and can implement additional or fewer features than what are described herein. Further, the features represented by the blocks can be combined in various ways.

The FIG. 3 embodiment includes a parameter value receiver 310, an average probability calculator 320, a process index calculator 330, and an estimator 340. The parameter value receiver 310 can receive values of parameters 216, 226 measured for either components 214, 224 built using a new process 210 or an old process 220. The average probability calculator 320 can calculate average probabilities of failure 218, 228. For example, the average probability calculator 320 can use the values of parameters 226 measured for components 224 built using the existing process 220 to calculate one average probability for failure 228, and use the values of parameters 216 measured for components 214 built using a new process 210 to calculate another average probability for failure 218. The process index calculator 330 can receive the average probabilities for failure 218, 228 and calculate a process index 230, 232, 234.

Optionally, the process index calculator 330 can receive rates of production 213, 223 and/or the value of the components 214, 224. The process index calculator 330 can calculate one or more process indexes 230, 232, 234, such as the difference between the average probabilities to failure 230, the difference between the average probabilities multiplied by the difference between the rates of production 232, and/or the difference between the average probabilities multiplied by the difference between the rates of production multiplied by the value of the components 234.

The estimator 340 can estimate whether the new process 210 is better than the existing process 220, for example, by determining if the process index 230, 232, 234 is positive. If the process index 230, 232, 234 is positive, then the new process 210 can be estimated as better than the existing process 220.

OPERATIONAL EXAMPLE OF A METHOD FOR EVALUATING PROCESSES FOR MANUFACTURING COMPONENTS

Figure 4:
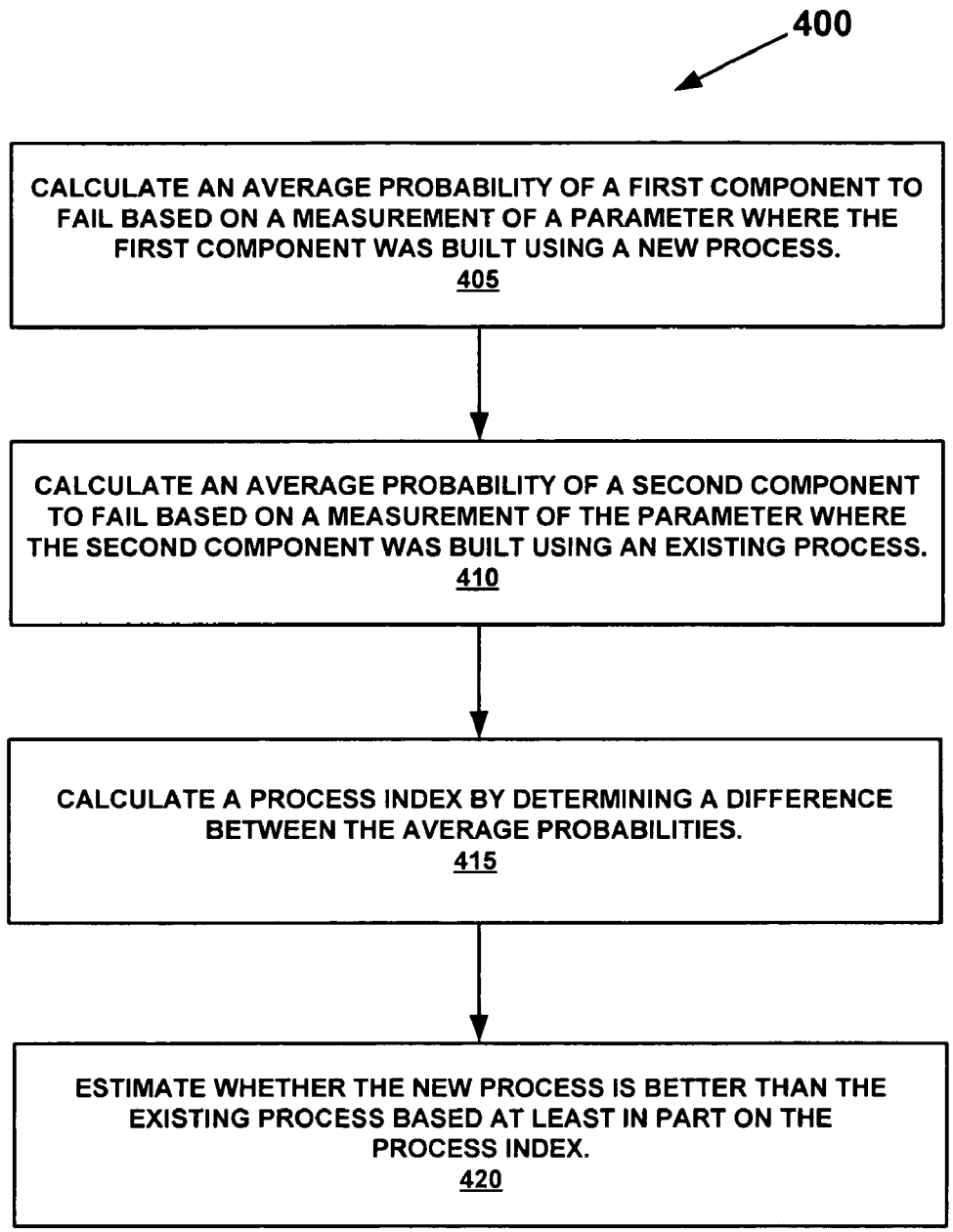
FIG. 4 depicts a flowchart for a method of evaluating processes for manufacturing components, according to embodiments of the present invention.

FIG. 4 depicts flowchart 400 for a method of evaluating processes for manufacturing components, according to embodiments of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. All of, or a portion of, the embodiments described by flowchart 400 can be implemented using computer-readable and computer-executable instructions which reside, for example, in computer-usable media of a computer system or like device. For the purposes of illustration, the discussion of flowchart 400 shall refer to the structures depicted in FIGS. 1, 2, and 3.

In step 405, an average probability of a first component to fail is calculated based on a measurement of a parameter where the first component was built using a new process, according to one embodiment. For example, the parameter value receiver 310 can receive values of parameters 216 measured for components 214 built using a new process 210. The average probability calculator 320 can use the values of parameters 216 to calculate an average probability for failure 218.

As already stated, the probabilities to fail (calculated using equation 134 for example) for each of the components 214 can be used to calculate an average probability to fail 214. For example, referring to FIGS. 1 and 2, once parameters 216 for the components 214 using the new process 210 have been measured, the results can be evaluated using the equation 134 for the probability of components to fail. The probabilities to fail for the components 214 built using the new process 210 can be used to calculate an average probability to fail 218.

In step 410, an average probability of a second component to fail is calculated based on a measurement of the parameter where the second component was built using an existing process, according to one embodiment. For example, the parameter value receiver 310 can receive values of parameters 226 measured for components 224 built using an existing process 220. The average probability calculator 320 can use the values of parameters 226 to calculate an average probability for failure 228.

As already described herein, components 224 do not have to be built using the existing process 220 at the time that components 214 are built using the new process 210 in order to calculate a process index 230, 232, 234. Instead, since components 224 have been built 222 in the past using the existing process 220, the parameters 226 of these components 224 could have been measured 226 and the values from the measurements could have been saved for later comparisons with new processes 210, for example by storing the values in a table. The values can be retrieved from the table and used in calculating the average probability of failure 228 for components 224 built with the existing process 220, etc.

As already stated, the probabilities to fail (calculated using equation 134 for example) for each of the components 224 can be used to calculate an average probability to fail 228. For example, referring to FIGS. 1 and 2, once parameters 226 for the components 224 using the existing process 220 have been measured, the results can be evaluated using the equation 134 for the probability of components to fail. The probabilities to fail for the components 224 built using the existing process 220 can be used to calculate average probability to fail 228.

In step 415, a process index is calculated by determining a difference between the average probabilities, according to one embodiment. For example, the process index calculator 330 can receive the average probabilities for failure 218, 228 and calculate a process index 230, 232, 234.

Optionally, the process index calculator 330 can receive rates of production 213, 223 and/or the value of the components. The process index calculator 330 can calculate one or more process indexes, such as the difference between the average probabilities to failure 230, the difference between the average probabilities multiplied by the difference between the rates of production 232 and/or the difference between the average probabilities multiplied by the difference between the rates of production multiplied by the value of the components 234.

In step 420, an estimate is made as to whether the new process is better than the existing process based at least in part on the process index, according to one embodiment. For example, the estimator 340 can estimate whether the new process 210 is better than the existing process 220, for example, by determining if the process index 230, 232, 234 is positive. If the process index 230, 232, 234 is positive, then the new process 210 can be estimated as better than the existing process 220.

CONCLUSION

Although many of the examples described herein referred to products and/or components, such as disk drives and read/write heads, the embodiments described herein can be used for evaluating processes for manufacturing any type of product and/or component. Although many of the examples described herein refer to parameters, such as recession and amplitude, the embodiments described herein can use any parameter of any component. For example, almost any parameter of a read/write head can be measured such as all of the dimensions, the electrical and magnetic properties, etc. Although many of the examples described herein referred to the probability of failing a test, the probability of passing the test can also be used and should be considered as an equivalent. Embodiments of the invention can use any algebraic equivalent for the equations presented herein.

Although many of the examples described herein referred to "building" (212, 222) components 214, 224, the term "building" shall include simulating and/or using analytical models to obtain values for parameters 216, 226 for the purpose of computing average probabilities to fail 218, 228 and/or process indexes 230, 232, 234, among other things.

What is claimed is:

1. A computer implemented method of evaluating processes for manufacturing components, the method comprising:

calculating an average probability of a first component to fail based on a first measurement of a parameter, wherein the first component was built using a new process;

calculating an average probability of a second component to fail based on a second measurement of the parameter, wherein the second component was built using an existing process;

calculating a process index by determining a difference between the average probability of the second component to fail and the average probability of the first component to fail, wherein said calculating the process index comprises multiplying a value of the component with the difference between the average probabilities;

estimating whether the new process is better than the existing process based at least in part on the process; and storing said process index for later use.

2. The method as recited in claim 1, wherein the calculating the process index by determining a difference between the average probability of the second component to fail and the average probability of the first component to fail further comprises:
using the equation $\overline{Pf2}-\overline{Pf1}=\Delta \overline{Pf}$,
wherein $\overline{Pf2}$ represents the average probability of the second component to fail,
$\overline{Pf1}$ represents the average probability of the first component to fail and
$\Delta \overline{Pf}$ represents the process index.

3. The method as recited in claim 1, wherein the using the new process to build the first component further comprises:
measuring a first rate of production while using the new process to build the first component; and
measuring a second rate of production while using the existing process to build the second component.

4. The method as recited in claim 3, wherein the method further comprises:
measuring the first rate of production in units per period of time; and
measuring the second rate of production in units per period of time.

5. The method as recited in claim 3, wherein the calculating the process index further comprises:
determining a difference between the second rate of production and the first rate of production; and
multiplying the difference between the average probabilities with the difference between the rates of production.

6. The method as recited in claim 5, wherein:
the difference between the second rate of production and the first rate of production uses the equation $R2-R1=\Delta R$, wherein $R2$ represents the second rate of production, $R1$ represents the first rate of production, and $\Delta R$ represents the difference; and
the multiplying the difference between the average probabilities with the difference between the rates of production further comprises:
using the equation $\Delta \overline{Pf}*\Delta R$, wherein $\Delta \overline{Pf}$ represents the difference between the average probabilities.

7. The method as recited in claim 5, wherein the calculating the process index further comprises:
multiplying a value of the component with the difference between the average probabilities and the difference between the rates of production.

8. The method as recited in claim 7, wherein the multiplying the value of the component with the difference between the average probabilities and the difference between the rates of production further comprises:
using the equation $\Delta \overline{Pf}*\Delta R*V$, wherein $\Delta \overline{Pf}$ represents the difference between the average probabilities, $\Delta R$ represents the difference between the rates, and $V$ represents the value of the component.

9. The method as recited in claim 1, wherein the multiplying the value of the component with the difference between the average probabilities further comprises:
using the equation $\Delta \overline{Pf}*V$, wherein $\Delta \overline{Pf}$ represents the difference between the average probabilities, and $V$ represents the value of the component.

10. The method as recited in claim 1, wherein the value of the component is in dollars per unit.

11. The method as recited in claim 1, wherein the calculating the average probabilities for the first and the second components further comprises:
calculating at least one of the average probabilities for the first and the second components is based on a multiple variant model fitting.

12. The method as recited in claim 1, wherein the calculating at least one of the average probabilities for the first and the second components further comprises:
calculating at least one of the average probabilities for the first and the second components, wherein a type of the first and second components is selected from a group consisting of a read/write head and a disk drive.

13. The method as recited in claim 1, wherein the estimating whether the process is better than the existing process further comprises:
if the process index is a positive value then the new process is estimated to be better than the existing process.

14. The method as recited in claim 1, wherein the method further comprises:
determining that a measurement of the parameter does not pass a test.

15. The method as recited in claim 1, wherein the calculating the process index does not require the first component and the second component to be assembled into a final product to estimate whether the new process is better than the existing process.

16. The method as recited in claim 1, wherein the calculating the average probability of the first component to fail further comprises:
calculating the average probability of the first component to fail is based on a plurality of components built using the new process.

17. The method as recited in claim 1:
wherein the calculating the process index further comprises calculating the average probability to fail for more than one type of component; and
wherein the calculating the process index further comprises using the average probabilities for the more than one type of component to calculate the process index.

18. An apparatus for evaluating processes for manufacturing components, the apparatus comprising:
means for calculating average probabilities, means for calculating a process index, means for estimating, wherein the means for calculating average probabilities is coupled to the means for calculating the process index and the means for calculating the process index is coupled to the means for estimating;
the means for calculating average probabilities calculates an average probability of a first component to fail based on a first measurement of a parameters wherein the first component was built using a new process;
the means for calculating average probabilities calculates an average probability of a second component to fail based on a second measurement of the parameter, wherein the second component was built using an existing process;
the means for calculating the process index calculating the process index by determining a difference between the average probability of the second component to fail and the average probability of the first component to fail; wherein the means for calculating the process index multiplies a value of the component with the difference between the average probabilities;
the means for estimating estimates whether the new process is better than the existing process based at least in part on the process index; and
means for storing said process index for later use.

19. The apparatus of claim 18, wherein the apparatus further comprises:
   a value receiver for receiving a first rate of production that was measured while using the new process to build the first component;
   the value receiver receiving a second rate of production while using the existing process to build the second component.

20. The apparatus of claim 19, wherein:
   the means for calculating the process index determines the difference between the second rate of production and the first rate of production; and
   the means for calculating the process index multiplies the difference between the average probabilities with the difference between the rates of production.

21. The apparatus of claim 18, wherein the estimating whether the process is better than the existing process further comprises:
   if the process index is a positive value then the means for estimating estimates that the new process is better than the existing process.

\* \* \* \* \*